United States Patent

[11] 3,599,695

| | | | |
|---|---|---|---|
| [72] | Inventor | Donald L. Knight Kent, Ohio | |
| [21] | Appl. No. | 732,206 | |
| [22] | Filed | May 27, 1968 | |
| [45] | Patented | Aug. 17, 1971 | |
| [73] | Assignee | The Goodyear Tire & Rubber Company Akron, Ohio | |

[54] PNEUMATIC TIRE
10 Claims, 3 Drawing Figs.

[52] U.S. Cl. .................................................. 152/352
[51] Int. Cl. ................................................. B60c 3/00
[50] Field of Search ........................................... 152/300, 352—356

[56] References Cited
UNITED STATES PATENTS

| 2,751,959 | 6/1956 | Blomquist | 152/352 X |
| 3,237,672 | 3/1966 | McMannis | 152/352 |
| 3,347,301 | 10/1967 | Sidles | 152/352 |
| 1,554,370 | 9/1925 | Renner | 152/356 X |
| 1,802,088 | 4/1931 | Midgley | 152/356 X |

FOREIGN PATENTS

| 355,398 | 8/1905 | France | 152/352 |
| 708,976 | 5/1931 | France | 152/352 |

Primary Examiner—Arthur L. La Point
Attorneys—F. W. Brunner and M. William Goodwin ABSTRACT: A pneumatic tire having a carcass and a tread disposed about the carcass wherein the ground contact surface of the tread, when the tire is viewed in cross section, is generally sinuous in configuration to provide at the tread centerline a convex portion bounded at its opposite sides by a pair of reversely curved concave portions each of which is disposed between the tread centerline and the shoulder areas of the tire or lateral edges of the tread. The carcass underlying the tread has a cross-sectional contour in the crown area of the tire which generally approximates the sinuous configuration of the ground contacting surface of the tread. The tread may be thicker at the centerline than it is generally at the center of the two portions of the tread underlying the concave portions of the ground contacting surface of the tread.

PATENTED AUG 17 1971

INVENTOR.
DONALD L. KNIGHT

M. William Goodwin
ATTORNEY

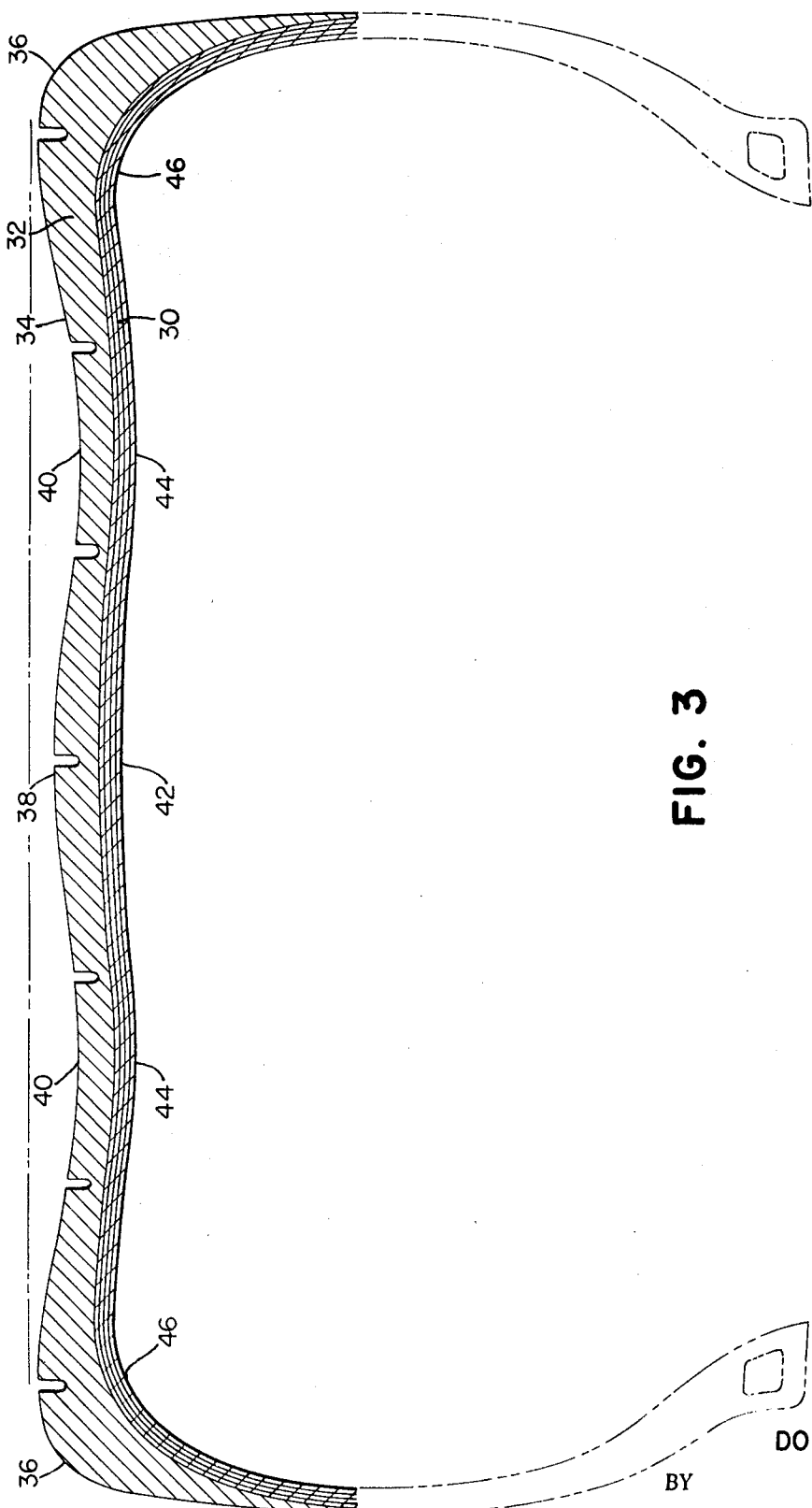

PNEUMATIC TIRE

This invention relates to pneumatic tires, and more particularly to a novel and improved construction for and method of making such tires.

Recent tire designs for passenger cars have involved relatively low aspect ratios and relatively wide treads. As used herein in the term "aspect ratio" means the ratio of the total section height of the tire to the total section width of the tire. By section height is meant the cross-sectional height of the tire as measured from the base of the beads of the tire to the outer ground contacting surface of the tread at the midcircumferential plane of the tire. By midcircumferential plane of the tire is meant the plane extending at right angles to the rotational axis of the tire and through the circumferential centerline of the ground contacting surface of the tread. The sectional width of the tire is the total cross-sectional width of the tire as measured between the points of maximum cross-sectional width of the tire. By the cross section of the tire is means the contour, etc., of the tire as it appears in planes extending through and containing the rotational axis of the tire, or in other words, in planes extending at right angles to the midcircumferential plane of the tire and through the rotational axis of the tire.

It has been found with high speed racing cars traveling at speeds in excess of 150 miles per hour that problems in handling develop which may at least in part be due to an unexpected change in the cross-sectional shape of the tire. More specifically, with tires having aspect ratios below about 0.55 and tread widths of 11 inches and greater, as well as with other tires, it is a common practice to reverse mold the tires. Reverse molding is a technique of molding wherein the tread is substantially depressed during the molding and curing process so that, in cross section, the tread ground contacting surface is concave and the outer diameter of the tire at the centerline of the tread is substantially less than the outer diameter of the tire at the lateral edges of the tread. Reverse molding is utilized to attempt to obtain a relatively flat ground contacting surface when the tire is inflated. It has now been found that even with reverse molding, the ground contacting surface of the tread may not remain flat at speeds, for example, in excess of 150 miles per hour. In these higher speed ranges, quite unexpectedly, it has been found that the tread has a diameter at its centerline which is less than the diameter of portions of the tread spaced laterally outwardly from the centerline of the tread, but inwardly of the lateral edges of the tread. This has been observed in high speed photographs of a tire on a test wheel with reference to an unloaded portion of the tire and has been verified by temperature measurements of tires after high speed runs where it has been found that the center portion of the tread is substantially cooler than are the above-mentioned pair of portions spaced outwardly from the centerline. This change in shape of the tire results in reduced contact area between the tire and the road, and in particular provides an area of little or no contact at the central portion of the tread and a pair of relatively small contact area portions spaced laterally outwardly from the centerline of the tire. This change in cross-sectional contour of the tire at high speeds results in reduced controllability of the vehicle in high speed turns and some sense of instability when the vehicle is traveling in a straight line at high speed.

Accordingly, it is the primary object of this invention to provide a tire of novel and improved construction which will provide improved stability at high speeds, and particularly improved controllability in high speed cornering. Included within the primary object is the object of providing a novel and improved method of manufacturing a pneumatic tire to accomplish the desired primary objective of the invention.

Other objects will be in part obvious, and in part pointed out more in detail hereinafter.

In the drawings:

FIG. 3 is a cross-sectional view of a tire incorporating, and constructed in accordance with, the present invention.

Figure 1:
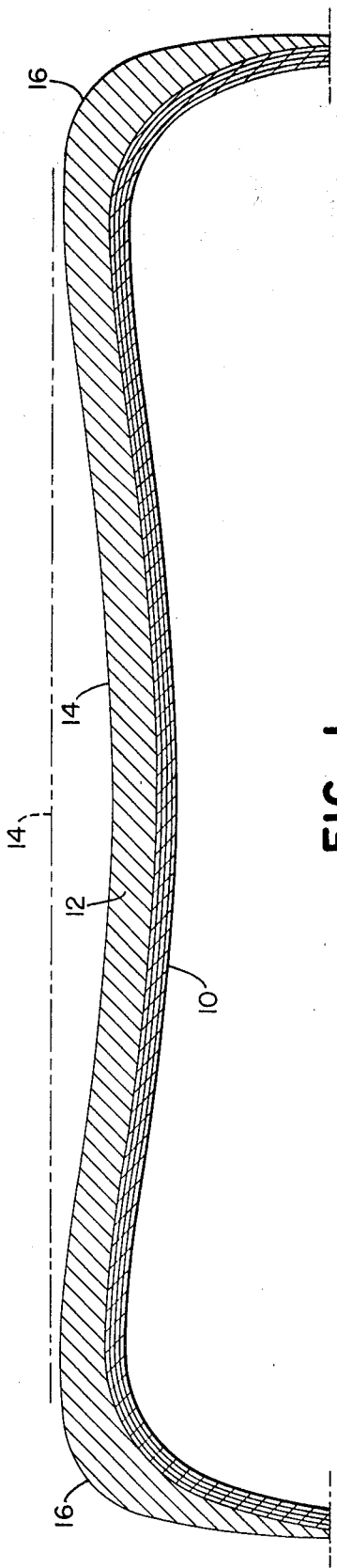
FIG. 1 is a fragmentary cross-sectional view of a high speed racing tire of known design.
Figure 2:
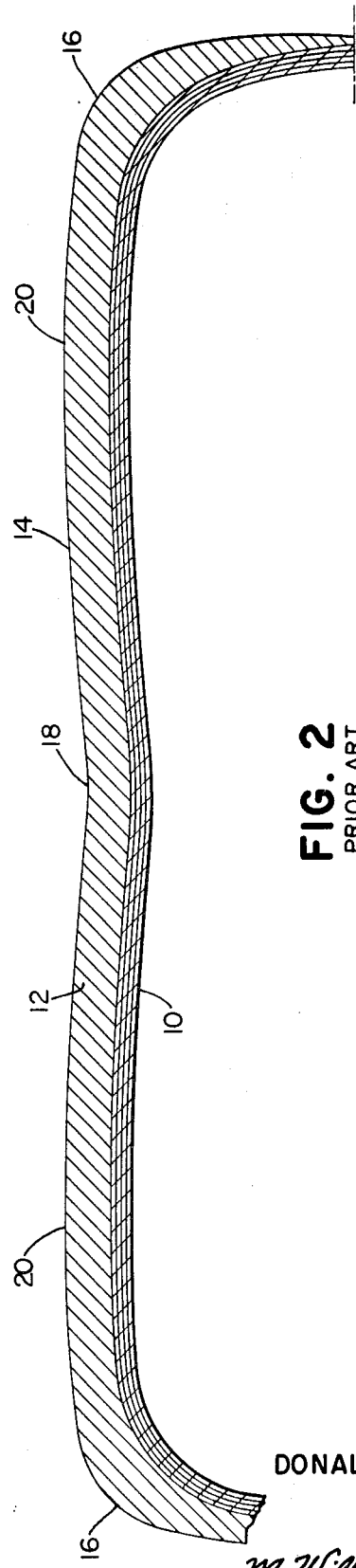
FIG. 2 is a fragmentary cross-sectional view of the tire of FIG. 1 illustrating, generally, the change in cross section of the tire at high speeds.

With reference to the drawings and particularly FIGS. 1 and 2 there is shown a high speed pneumatic tire of generally conventional construction. The tire includes a four ply cord fabric carcass 10 and a tread portion 12 disposed about the carcass and overlying the same. The tread 12 has a ground contacting surface 14 extending between the lateral edges 16 of the tread which are adjacent the shoulders of the tire. FIG. 1, in the solid line portion thereof, represents the cross-sectional configuration of the tire when in the curing mold or when uninflated, the tire having generally the same configuration in either condition of the tire although the diameter of the tire will be somewhat greater when in the mold. It will be noted that the minimum diameter of the ground contacting surface 14 of the tread is at the circumferential centerline thereof inasmuch as the tire has been reverse molded, resulting in the ground contacting surface being concave when the tire is uninflated. As shown in broken line in FIG. 1, when the tire is inflated, the ground contacting surface 14 of the tread becomes essentially flat. Also, when the tire is inflated the section height of the tire increases substantially, and the section width of the tire increases. This, of course, is conventional in reverse molding of tires. When the tire is run at low and moderately high speeds the ground contacting surface 14 will remain substantially flat as is desired. However, and with reference to FIG. 2, when the speed of the vehicle reaches a certain speed, perhaps 150 miles per hour and higher, the ground contacting surface 14 begins to be depressed as at 18 relative to a pair of portions 20 of the ground contacting surface disposed laterally outwardly of the centerline of the tread and between the centerline and the lateral edges 16 of the tread. The result if a concavity 18 centered relative to the centerline of the tread, and a pair of convex portions 20 on the opposite sides of the central portion 18 and between the central concave portion 18 and the edges 16 of the tread. These convex portions of the ground contacting surface of the tread tend to provide two spaced apart, parallel and relatively narrow areas of contact with the road on which the car will ride, resulting in reduced stability and controllability of the car, particularly in high speed turns.

With reference to FIG. 3, the tire of the present invention, as in the tire of FIGS. 1 and 2, comprises a carcass 30 which is of four ply fabric cord construction and a tread portion 32 having a ground contacting surface 34. The tire is shown in FIG. 3 in its uninflated condition in which condition, as in the case of the tire of FIG. 1, its cross-sectional configuration is generally the same as the cross-sectional configuration of the tire when the tire is in the mold in which it is cured. The tire is manufactured using a reverse molding procedure. In other words, after the tire carcass and tread have been assembled, the tire is shaped to the generally toroidal shape shown in FIG. 3, and while the tire is being cured the tread is maintained depressed so as to have a diameter at its centerline which is substantially less than the diameter of the tire adjacent the lateral edge portions 36 of the tread.

However, in accordance with the present invention, the ground contacting surface 34 of the tread is provided with a central portion 38 which is convex resulting in the ground contacting surface 34 having a diameter at the circumferential centerline thereof which is substantially greater than might be the case if the tire were conventionally reverse molded, as described above in connection with FIG. 1. The central convex portion 38 of the tread surface terminates at its ends in a pair of reversely curved concave portions 40 spaced outwardly from the midcircumferential plane of the tire and on opposite sides of said plane. The concave portions 40 are spaced between the centerline of the tread and the lateral edge portions 36 thereof. The ground contacting surface 34 extends laterally outwardly of the tread from the ends of the concave portions 40 into the lateral edge portions 36 of the tread and in so doing the surface 34 undergoes a reverse curvature. The result is that the ground contacting surface 34 has a generally sinusoidal configuration when the tire is viewed in cross section, or in others words, when viewed in planes containing the rotational axis of the tire. Thus, a tire according to the present invention has, in its uninflated condition, a ground contacting surface 34 comprising a central convex portion 38, the maximum diameter of which is greater than the minimum diameter of the intermediate concave portions 40 disposed on opposite sides of the central portion and lesser than the maximum diameter of the surface 34 adjacent the lateral edge portions thereof.

Also, in accordance with the invention, the carcass 30 in the crown region of the tire underlying the tread generally follows the sinusoidal path of the ground contacting surface 34 so that it too is provided with a central portion 42 underlying the central portion 38 of the ground contacting surface 34 with the central portion 42 of the carcass also being generally convex when the tire is viewed in cross section as in FIG. 3. The portion 42 of the carcass merges at its opposite ends into a pair of reversely curved, concave portions 44 underlying the concave portions 40 in the tread surface 34. The intermediate portions 44 of the carcass merge at their outer ends with reversely curved convex portions 46 which are disposed generally beneath the outer edge portions 36 of the tread surface 34. The maximum outer diameter of the central carcass portion 42 is greater than the minimum outer diameter of the concave portions 44 and less than the outer or maximum diameter of the convex portions 46.

Further, in the tire of FIG. 3, the thickness of the tread 32 is greater at the centerline of the tread, or in other words, the centerline of the central portion 38, than it is at the center portions of the intermediate portions of the tread underlying the concave portions 40 of the ground contacting surface 34. Thus, the tread diminishes in thickness from the central portion thereof in opposite directions laterally of the tread generally to the center of the tread portions underlying the intermediate portions 40 of the ground contacting surface and then increases in diameter laterally outwardly of the tread toward and ending with the lateral edge portions of the tread adjacent the shoulder region of the tire.

With a tire constructed in accordance with this invention, when the tire is inflated the ground contacting surface 34 will be generally flat, as indicated in broken line in FIG. 3. Contrary to a tire such as illustrated in FIGS. 1 and 2, however, the tire of FIG. 3 will maintain a substantially flat ground contacting surface even at high speeds in excess of 150 miles per hour. This has been evidenced after high speed testing by marked increases in the temperature of the ground contacting surface of the tire adjacent the centerline of the tire and a greater uniformity of temperature across the tread. The performance of a tire constructed as shown and described in connection with FIG. 3 has improved controllability, particularly with respect to high speed cornering and appears to have at least some improved stability in straight line high speed operation.

A specific example of the construction of a tire incorporating the present invention follows. The tire involved was a 12.50-15 tire having an outer diameter at the tread centerline, when uninflated, of approximately 26.6 inches, and, when inflated to normal operating pressure of approximately 35 p.s.i., having an outer diameter at the tread centerline of approximately 26.8 inches. The section height of the uninflated cured tire was approximately 5.7 inches, and of the inflated tire was approximately 5.9 inches. The maximum diameter of the uninflated tire at the edges of the tread was about 26.9 inches and the minimum diameter of the tire at the portion 40 was about 26.4 inches. The spacing between the circumferential centerline of the ground contacting surface 34 of the uninflated tire and the center or minimum diameter portion of each of the portions 40 was about 2.5 inches. The section width of the tire was approximately 13 inches when the tire was uninflated, and approximately 13.2 inches when the tire was inflated. The tread thickness at the centerline of the uninflated tire was approximately 0.20 inch, and at the centers of the portions of the tread underlying the intermediate portions 40 of the ground contacting surface was approximately 0.18 inch. The tread thickness at the shoulders or lateral edges of the tread portion in both the inflated and uninflated tire was approximately 0.45 inch. This tire was constructed of four ply nylon fabric with a cord angle of all plies in the cured tire being approximately 28.5° at the centerline of the tread, and with the end count of the inner pair of plies being approximately 42 and of the outer pair of plies being approximately 29. By end count is meant the number of cords per inch as measured at right angles to the cords at the centerline of the tread. The cords utilized were designated 840/2, meaning the cords were of cabled construction utilizing two yarns, each of which was 840 denier. Such a cord has a diameter of approximately 0.021 inch. Thus it will be seen that particularly with respect to the inner plies the spacing between cords at the centerline of the tire was something less than 0.003 inch. The tread width of the tire was approximately 11 inches.

It will be observed that the tire just described in detail had a cord angle which was less than 30° and it appears that the present invention is most advantageously used in connection with tires in which the cord angle at the centerline of the tire is less than 30°. Additionally, the tire was of a nonbelted construction and the end count of the fabric, at least of the inner two plies, was quite high at the centerline. More particularly, it will be observed that the end count essentially equaled 1/D where D is the diameter of the cords. In other words, the cords at the centerline of the tire were essentially side by side with little rubber therebetween. Therefore, where the end count is expressed as substantially 1/D, it is to be understood that I mean to include some spacing of the cords, although such spacing is minimal, for example, on the other of 0.001 to 0.003 inch. It has been mentioned hereinabove that the tread is thicker at the centerline of the tire than at portions spaced laterally outwardly of the centerline, and in the specific example described above, the tread was approximately 10 percent thicker at the centerline than it was at the two concave portions of the tread on opposite sides of the centerline. However, the difference in thickness of the tread may vary with the particular tire design, and I do not wish to be bound by any particular percentage of tread thickness variation. Also, while the invention has been described primarily in connection with high speed racing tires, it is not intended that the scope of the invention be so limited, rather it is contemplated that this invention may find utility among other things in passenger car tires, particularly of the low aspect ratio, wide tread type suitable for high performance vehicles.

Inasmuch as many changes could be made in the above-described construction or process without departing from the scope of this invention, it is intended that all matter contained in the above description or shown in the accompanying drawings shall be interpreted as illustrative and not in a limiting sense.

It is also to be understood that the language in the following claims is intended to cover all of the generic and specific features of the invention herein described and all statements of the scope of the invention which, as a matter of language, might be said to fall therebetween.

Having described my invention, I claim:

1. In a pneumatic tire of the type having a carcass portion and a tread portion disposed over and about the carcass portion and extending about the rotational axis of the tire, the improvement wherein when said tire is uninflated the ground contacting surface of said tread portion has at the circumferential centerline thereof a diameter which is greater than the minimum diameter of a first pair of portions of said ground contacting surface disposed respectively on opposite sides of said centerline and spaced between said centerline and the lateral edges of said ground contacting surface and less than the maximum diameter of a second pair of portions of said ground contacting surface disposed adjacent said lateral edges, and when said tire is inflated to normal operating pressure said ground contacting surface is generally flat in cross-sectional configuration.

2. In a pneumatic tire as described in claim 1, said ground contacting surface describing a generally sinuous path in planes containing said rotational axis so as to provide a peak at said centerline and valleys at said first pair of portions of said ground contacting surface.

3. In a pneumatic tire as described in claim 2, said carcass having a cross-sectional contour in said planes containing said rotational axis which generally corresponds to sad sinuous path of said ground contacting surface.

4. In a pneumatic tire as described in claim 1, said carcass having an outer diameter in the midcircumferential plane of the tire which is greater than the minimum outer diameter of a first pair of portions of the carcass generally underlying said first pair of portions of said ground contacting surface but less than the maximum outer diameter of a second pair of portions of said carcass disposed beneath said second pair of portions of said ground contacting surface.

5. In a pneumatic tire as described in claim 4, said tread portion having a thickness which diminishes from a central portion thereof extending circumferentially of the tire and in both directions laterally of said tread portion from said midcircumferential plane and then increases to a maximum value adjacent said lateral edges of said ground contacting surface.

6. In a pneumatic tire as described in claim 4, said ground contacting surface having a central portion which in planes containing said rotational axis is generally convex and which terminates at its lateral edges in a pair of reversely curved intermediate portions which in said planes are concave.

7. In a pneumatic tire as described in claim 6, said carcass having an aspect ratio of no greater than about 0.55.

8. In a pneumatic tire as described in claim 6, said carcass comprising a plurality of plies of cord reinforced fabric with the cord angle of said plies at the midcircumferential plane of the tire when inflated being less than 30°.

9. In a pneumatic tire as described in claim 8, said plies having at said midcircumferential plane an end count substantially equal to 1/D where D equals the diameter of the cords.

10. In a pneumatic tire as described in claim 1, said tread portion being thicker at said centerline that in the said first pair of portions at the minimum diameter of said first pair of portions.